United States Patent
Domard et al.

(10) Patent No.: US 9,238,880 B2
(45) Date of Patent: Jan. 19, 2016

(54) CHITOSAN YARN HAVING A CRYSTAL STRUCTURE CORRESPONDING TO THE ANHYDROUS ALLOMORPH AND A TENSILE STRENGTH, AFTER IMMERSION IN DEMINERALIZED WATER FOR FIFTEEN HOURS, OF AT LEAST 150 MPA

(75) Inventors: Alain Domard, Lyons (FR); Laurent David, Lyons (FR); Alexandra Montembault, Saint-Etienne (FR); Mylène Desorme, Saint Martin la Plaine (FR)

(73) Assignees: LABORATOIRE TETRA MEDICAL, Annonay (FR); UNIVERSITE CLAUDE BERNARD LYON I, Villeurbanne (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 996 days.

(21) Appl. No.: 13/201,489

(22) PCT Filed: Feb. 15, 2010

(86) PCT No.: PCT/FR2010/050249
§ 371 (c)(1),
(2), (4) Date: Oct. 6, 2011

(87) PCT Pub. No.: WO2010/094879
PCT Pub. Date: Aug. 26, 2010

(65) Prior Publication Data
US 2012/0022242 A1    Jan. 26, 2012

(30) Foreign Application Priority Data

Feb. 17, 2009    (FR) .................................... 09 51028

(51) Int. Cl.
*D01F 2/08* (2006.01)
*D01F 9/00* (2006.01)
(Continued)

(52) U.S. Cl.
CPC .. *D01F 9/00* (2013.01); *D01D 5/06* (2013.01); *D01F 2/24* (2013.01)

(58) Field of Classification Search
CPC .................................... D01F 9/00; D01F 2/24

USPC .......... 264/178 R, 204, 207; 428/364; 536/20
See application file for complete search history.

(56) References Cited

U.S. PATENT DOCUMENTS 5,618,561 A    4/1997   Della Valle et al.

FOREIGN PATENT DOCUMENTS

| EP | 0 077 098 | 4/1983 |
| JP | 04-119121 | 4/1992 |
| JP | 2009-108426 | 5/2009 |

OTHER PUBLICATIONS

Montembault et al., "Rheometric study of the gelation of chitosan in a hydroalcoholic medium", Biomaterials 26 (2005) 1633-1643, Jul. 2004.*

(Continued)

*Primary Examiner* — Galen Hauth
(74) *Attorney, Agent, or Firm* — Clark & Brody

(57) ABSTRACT

The invention relates to a method for producing an elongate polysaccharide element, in particular a chitosan thread, comprising an operation of extruding an extrusible solution of said polysaccharide through an extrusion die and an operation of coagulating the extruded solution. The extrusible solution is a hydroalcoholic solution containing an alcohol that does not form an azeotrope with water and which has a boiling point of more than 150° C. at atmospheric pressure. The coagulation operation includes a step of evaporating the water, preferably over the alcohol, producing a gelled extruded elongate element in the form of a mainly alcoholic gel, in particular by subjecting the extruded solution to a hot air flow. At least one operation of eliminating the alcohol contained in said gel makes it possible to obtain the elongate polysaccharide element. The chitosan thread has a crystalline structure corresponding to the anhydrous allomorph and a rupture stress of at least 150 MPa after being immersed in demineralized water for fifteen hours. The apparatus (1) for the wet extrusion of polysaccharide thread (10) includes an extruder (2) with at least one extrusion die (3), an evaporation enclosure (4) placed immediately after the output (3a) of the extrusion die (3) and supplied with a hot air flow, a neutralization unit (5), a washing unit (6), a drying unit (8) and a winding unit (9).

13 Claims, 2 Drawing Sheets

(51) Int. Cl.
*D01D 5/06* (2006.01)
*D01F 2/24* (2006.01)

(56) References Cited

OTHER PUBLICATIONS

Notin L. et al., "Morphology and mechanical . . . dry-jet stretching step and ageing", Acta Biomaterialia, Elsevier, Amsterdam, NL, vol. 2, No. 4, Jul. 1, 2006, pp. 387-402.
Ziabicki, Andrzej: "Fundamentals of Fibre Formation", 1976, John Wiley & Sons, London, XP002551346, p. 250.
Montembault A. et al., "Physico-chemical studies . . . a hydroalcoholic medium", Biomaterials, Elsevier Science Publishers BV., Barking, GB, vol. 26, No. 8, Mar. 1, 2005, pp. 933-943 XP025280402.
Boucard N. et al., "New Aspects . . . Hydroalcoholic Medium" Biomacromolecules, vol. 6, No. 6, Oct. 21, 2005, pp. 3227-3237, XP002551347.
George C. East et al., "Wet spinning . . . of Chitosan Fibers", Journal of Applied Polymer Science, 1993, 50(10) 1773-1779.
Okuyama K. et al., "Structural diversity . . . and it's complexes", Carbohydrate Polymers, 2000, 41(3), p. 237-247.
Ogawa K., "Effect of . . . and Polymorphs", Agricultural and Biological Chemistry, 1991, vol. 55, No. 9, p. 2375-2379.

\* cited by examiner

CHITOSAN YARN HAVING A CRYSTAL STRUCTURE CORRESPONDING TO THE ANHYDROUS ALLOMORPH AND A TENSILE STRENGTH, AFTER IMMERSION IN DEMINERALIZED WATER FOR FIFTEEN HOURS, OF AT LEAST 150 MPA

The present invention relates to the production, by extrusion, of an elongate polysaccharide element; it relates in particular to the spinning of chitosan.

Chitosan is a deacetylated derivative of chitin. It is a linear copolymer made up of the distribution, most commonly random, of D-glucosamine (deacetylated residue or unit) and of N-acetyl-D-glucosamine (acetylated residue or unit) linked together by β-(1→4) glycosidic linkages. Chitosan is biodegradable and biocompatible. Generally, it is also bioactive, in particular hypocholesterolemic, bacteriostatic, fungistatic and live-tissue regenerating. Owing to these properties, it is naturally of interest in the cosmetics, dietetics, pharmaceutical and biomaterials fields.

The most widely used technique for spinning chitosan is wet spinning (George C. East and Yimin Qin, Wet spinning of chitosan and the acetylation of chitosan fibers, Journal of Applied Polymer Science, 1993, 50 (10), 1773-9); it consists in preparing a chitosan collodion by putting chitosan into aqueous solution in a dilute acidic medium, in particular acetic acid, in extruding said collodion through a die into an alkaline coagulation bath, generally a solution of sodium hydroxide, of potassium hydroxide or of ammonia, and in washing, drying and then winding the coagulated filament obtained. The acid in the collodion is in stoichiometric amount relative to the amine functions of the chitosan, such that dissolution of the chitosan is obtained by virtue of the protonation of the amine functions of the glucosamine unit. During the extrusion of the collodion into the alkaline bath, in particular of sodium hydroxide, of potassium hydroxide or of an ammonia solution, the amine function is deprotonated, thereby causing precipitation of the chitosan and the formation of a salt, in particular of sodium acetate, potassium acetate or ammonium acetate, said salt subsequently being eliminated during the washing step.

Document WO 2005/025520 proposes a spinning technique which differs from the above in that the coagulating agent is no longer an alkaline solution but an alkaline gas, in particular ammonia. This dry spinning technique makes it possible to eliminate all the aqueous media at the die outlet, including the washing baths. This is because, given that the ammonium acetate salt formed inside the filaments during coagulation in the presence of the ammonia gas is readily hydrolyzed to acetic acid and ammonia, total or partial elimination thereof has been possible by the setting up of a moist hot air drying system which makes it possible to replace the washing/drying steps of the conventional wet spinning process. It should be noted that it may, moreover, be advantageous to maintain a certain presence of residual salts for some applications owing to the fact that this presence controls the fiber swelling properties in a strongly hydrated medium.

The subject of the present invention is a novel method for producing an elongate polysaccharide element which differs from the two abovementioned techniques.

In a known manner, this method comprises an operation of extruding an extrudable solution of said polysaccharide through an extrusion die and an operation of coagulating the extruded solution.

Characteristically, the extrudable solution is an aqueous-alcoholic solution containing an alcohol which does not form an azeotrope with water and which has a boiling point of at least 150° C. at atmospheric pressure, and the coagulating operation comprises a step of evaporating the water, in preference to the alcohol, producing a gelled extruded elongate element in the form of a mainly alcoholic gel, in particular by subjecting the extruded solution to the action of a hot air flow. Furthermore, the method comprises at least one operation of eliminating the alcohol contained in said gel in order to obtain the elongate polysaccharide element.

Thus, according to the present invention, on leaving coagulation, the gelled elongate element is in the form of a mainly alcoholic gel and the formation of the elongate polysaccharide element is obtained after elimination of the alcohol that is contained in said gel.

According to one embodiment variant, the polysaccharide present in the gelled element is in ionized form and the method comprises an operation of neutralizing the gelled element. This operation is aimed at neutralizing the charges carried by the ionized forms present in the gel, which results in the elimination of the electrostatic forces in favor of the hydrophobic interactions and of the hydrogen bonds responsible for the physical crosslinking of the polymer chains. If the ionized forms are of the polycation type, the operation uses a base to completely neutralize the polymer; for example, when the extrudable polysaccharide solution is an acidic chitosan solution, the base deprotonates the —$NH_3^+$ ammonium form to give the —$NH_2$ form. If the ionized forms are of the polyanion type, the operation uses an acid to completely neutralize the polymer; for example, when the extrudable polysaccharide solution results from the dissolving of hyaluronan or of alginate in an aqueous solution at neutral pH, the acid reprotonates the —$COO^-$ form to give the —COOH form.

Preferably, in this same embodiment variant, the neutralizing operation is followed by a washing operation, so as to eliminate the salts formed.

The alcohol contained in the gelled extruded element is eliminated during the neutralizing operation, when the latter takes place, by passing through a bath containing a solution, which is basic or acidic as appropriate, and also during the washing operation.

At least in the case of this embodiment variant of the present invention, implementing a neutralizing operation, the elongate element obtained has a particular crystal structure, this structure being characterized by a predominance of the anhydrous allomorph, whereas, with the other known techniques, it is a hydrated form.

According to one embodiment variant, the method also comprises a step of drying the elongate polysaccharide element.

The alcohol, contained in the extrudable solution, which does not form an azeotrope with water and which has a boiling point above 150° C., is chosen in particular from the group: 1,2- and 1,3-propanediol, 1,2-, 1,3- and 1,4-butanediol and 1,2,3-propanetriol. The boiling points are respectively 188° C. and 215° C. for 1,2- and 1,3-propanediol, 191° C., 208° C. and 230° C. for 1,2-, 1,3- and 1,4-butanediol and 290° C. for 1,2,3-propanetriol (or glycerol).

According to the invention, the alcohol must not form any azeotrope with water since, if the opposite is true, it is the azeotrope—i.e., the water/alcohol mixture—which is evaporated off and not preferentially the water, as is desired.

Preferably, the evaporation of water, in preference to the alcohol, is carried out by subjecting the extruded solution to the action of a hot air flow at a temperature of between 70° C. and 130° C. It is understood that the temperature in question can vary according to the boiling point of the alcohol retained for the formation of the extrudable aqueous-alcoholic solution.

The method of the present invention applies to chitosan and to many other polysaccharides, mainly those which are water-soluble and film-forming, and in particular which have β-(1→4) glycosidic linkages. Mention may be made of cellulose derivatives, hyaluronic acid, hemicelluloses, alginates and pectins.

As regards more particularly chitosan, the extrudable aqueous-alcoholic solution is preferably obtained by putting chitosan in an aqueous solution of acid, in particular in an acetic acid medium, and by adding the alcohol retained, which does not form an azeotrope with water and which has a boiling point above 150° C.; in addition, the neutralizing bath is, in this case, a solution of ammonia or of sodium hydroxide.

The elongate element obtained by means of the method of the invention is preferentially a yarn, the extrusion being carried out through a spinning die, either a single die, so as to form a continuous filament, or a multiple die, so as to form a multifilament yarn. In this case, the method comprises a final operation of winding the filament or the multifilament yarn obtained.

However, the method is not limited to spinning, it being possible for the elongate element to be in the form of a profiled element of any cross section, depending on the configuration of the extrusion die. It may in particular be a film, a sheet or a tube.

As regards more particularly the spinning of a polysaccharide yarn, the method comprises at least one drawing operation before, during and/or after elimination of the alcohol. Preferably, this drawing takes place at least immediately on exiting the extrusion die.

According to one embodiment variant, the evaporation conditions are regulated so as to eliminate a controlled amount of water contained in the extruded aqueous-alcoholic solution, so as to obtain an elongate element, in particular a yarn, the crystal structure of which comprises a controlled fraction of a structure corresponding to the anhydrous allomorph of the polysaccharide.

As regards the spinning of chitosan, the yarn obtained under the above conditions has, by virtue of its anhydrous allomorph structure, improved mechanical properties, in particular a tensile strength, after immersion in demineralized water for fifteen hours, of at least 150 MPa. In addition, in the chitosan yarn obtained by means of the method of the present invention, the anhydrous allomorph was not formed to the detriment of the polymer chains, which makes it possible to maintain, in the yarn, a chitosan having a high weight-average molecular weight, in particular of greater than 350 000 g/mol.

The present invention will be understood more clearly on reading the description hereinafter of an example of production of a chitosan yarn illustrated by the drawing appended hereto, in which.

Figure 1:
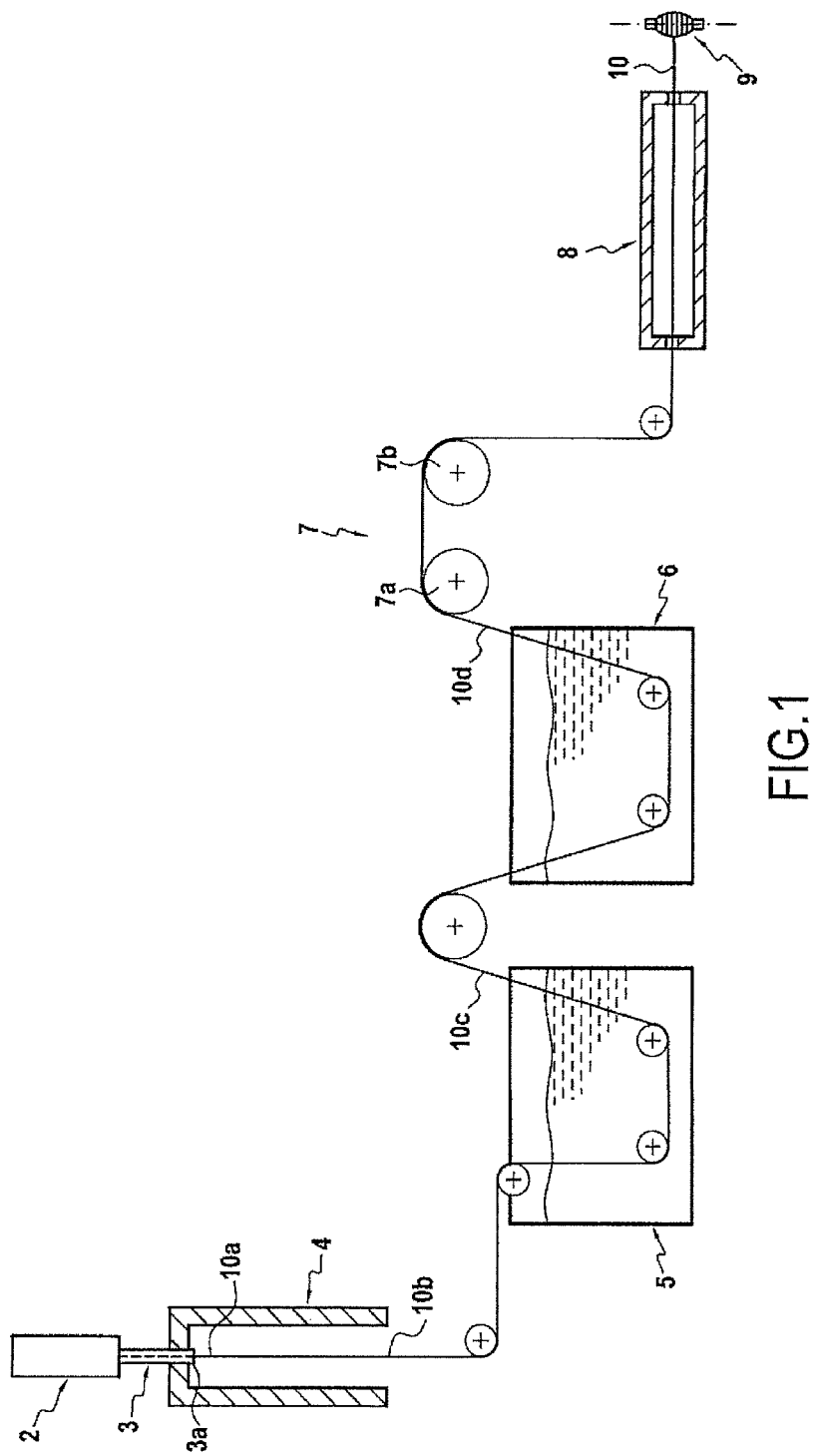
FIG. 1 is a diagrammatic representation of the spinning apparatus.

The apparatus 1 comprises, successively, an extruder 2 and its extrusion die 3, an evaporation chamber 4, a neutralizing unit 5, a washing unit 6, a drawing system 7, a drying unit 8 and a winding unit 9.

The apparatus having the above composition can enable the production of a yarn, either a continuous filament or a multifilament yarn, depending on whether the extrusion die 3 is a simple die with a single hole or a die comprising a plurality of holes; it can also enable the production of a film that can be wound in the form of a reel, with a die 3 having a rectangular cross section.

If it is a question of extruding a sheet, or any other form (hollow fiber, tube, various profiled elements), that cannot be wound on itself, the apparatus will have to comprise additional means for sequenced cutting and handling for the production of unit sections of said sheet.

The detailed example which will be described hereinafter relates to the production of a chitosan yarn; this example is not limiting with respect to the present invention, it being possible for the latter to relate to the production of any elongate polysaccharide element which is capable of being solubilized in the form of a spinnable aqueous-alcoholic solution and which, in addition, has film-forming properties. Mention may in particular be made of cellulose ethers, such as carboxymethylcellulose (CMC), hydroxypropylcellulose (HPC), methylcellulose (MC), methylethylcellulose (MEC) or hydroxymethylpropylcellulose (HPMC), cellulose esters and mainly cellulose acetate, hyaluronic acid, certain hemicelluloses, alginates and certain pectins, in particular homogalacturonan.

The aqueous-alcoholic chitosan solution is prepared by dissolving the chitosan in an aqueous solution of acid and by then adding to this solution an alcohol which does not form an azeotrope with water and which has a boiling point much higher than that of water, namely of at least 150° C. The aqueous solution of acid, preferably acetic acid, is obtained by adding an amount of acid which is stoichiometric with respect to the free amine functions of the dissolved chitosan. The alcohol chosen in order to obtain the aqueous-alcoholic chitosan solution is, for example, 1,2-propanediol, which has a boiling point of 188° C.

Before being extruded, the aqueous-alcoholic solution is degassed in order to remove the gas bubbles that may be responsible for defects in the yarn obtained.

The aqueous-alcoholic solution should have a viscosity that is sufficient to allow extrusion but not too high, so as not to have degassing times that are too long. For this, a solution having a concentration of from 1.5 to 3% by weight of chitosan in a water/alcohol mixture in a proportion of from 50/50 to 30/70% by weight is used. In order to obtain the appropriate viscosity with low chitosan concentrations, it is preferable to use a chitosan of high molar mass, for example in the weight-average molar mass $M_W$ range of from 150 000 to 650 000 g/mol. The aqueous-alcoholic chitosan solution has an apparent viscosity between 1000 and 2000 Pa·s, preferably about 1500 Pa·s.

Moreover, the best mechanical properties for the yarn are obtained by using a chitosan for which the degree of acetylation is low, in particular less than 40%, preferably less than 30%. The degree of acetylation (DA) is the percentage of acetylated units relative to the total number of units present on the chitosan chain, i.e. their molar fraction multiplied by 100. It can be determined by Fourier transform infrared spectrometry or preferentially by $^1$H NMR spectrometry. The above comment is not limited to the acetylated forms of chitosan; it also relates to all other acylated forms of the primary amine function, in particular ethyl, propyl or butyl chitosan having a low degree of acylation, for example less than 40%.

In a specific exemplary embodiment, the extrudable aqueous-alcoholic chitosan solution was obtained by starting from, as raw material, a chitosan (Mahtani Chitosan) having a degree of acetylation of between 1 and 3% and a high weight-average molar mass of between 450 000 and 600 000 g/mol.

The aqueous-alcoholic solution, having an initial concentration, before degassing, of 2.4% by weight of chitosan, a water/alcohol proportion of 40/60% by weight and an apparent viscosity, after degassing, close to 1500 Pa·s, was extruded through a single-hole tube die, the internal cross section of which had a diameter of 0.8 mm. The extrusion was carried out with a flow rate of between 3 and 20 ml/h.

As illustrated in the figure, the downstream end 3a of the extrusion die 3 penetrates into the evaporation chamber 4, which is supplied with a hot air flow under flow rate and temperature conditions which allow the evaporation of the water in preference to that of the alcohol. To do this, the apparatus comprises at least means for controlling the temperature of the hot air flow entering the chamber 4 and preferably also means for controlling its flow rate. By evaporating the water, the composition of the solvent of the extruded yarn 10a is modified. Influence is exerted in particular on the value of the dielectric constant of the solvent and, consequently, on the hydrophilic/hydrophobic interaction balance which, when it reaches a critical value, results in the gelling phenomenon, which is reflected by a gradual solution/gel transition from the surface to the core of the yarn. Thus, the extruded yarn 10a leaving the die 3 is gelled, throughout its cross section or at least in its periphery, when it leaves the evaporation chamber 4. The gelled yarn 10b obtained, which is in the form of a mainly alcoholic chitosan gel, already has sufficient mechanical properties to be pulled toward the following units of the apparatus 1. The gelled yarn 10b goes into the neutralizing unit 5 consisting of a tank filled with an alkaline aqueous solution, in particular a solution of ammonia, of sodium hydroxide or of potassium hydroxide.

The passing of the gelled yarn 10b through this alkaline solution leads to the conversion of the —$NH_3^+$ sites to —$NH_2$ sites, thereby reducing the electrostatic repulsions between the polymer chains and thus promoting the formation of hydrogen bonds and of hydrophobic interactions, which results in the creation of physical crosslinking nodes and, subsequently, of crystallites.

The gelled and neutralized yarn 10c, on leaving the neutralizing unit 5, then passes into the washing unit 6 consisting of a tank filled with water. The purpose of this washing is to eliminate the excess base and the salts formed, for example ammonium acetate, sodium acetate or potassium acetate, according to the composition of the alkaline solution, optionally sodium chloride in the case where the extrudable aqueous-alcoholic solution contains hydrochloric acid and the neutralization contains a solution of sodium hydroxide. During this washing operation, the possible residual traces of alcohol are definitively eliminated.

The gelled, neutralized and washed yarn 10d, obtained at the outlet of the washing unit 6, subsequently passes into the drying unit 8 consisting of a chamber through which a hot air flow passes at a temperature of about 100 to 110° C. The chitosan yarn 10e leaving the drying is wound in the form of a reel in the final winding unit 9.

The apparatus 1 represented in the figure also comprises drawing systems: one placed at the die outlet after evaporation of the water, another between the washing unit 6 and the drying unit 8, noted 7 in the figure. These drawing systems are composed of two rolls, for example 7a and 7b, around which the respectively gelled, neutralized and washed yarn 10d makes several turns, the downstream roll 7b being driven at a linear speed greater than that of the upstream roll 7a. The purpose of this drawing is to improve the mechanical characteristics of the yarn 10. More generally, this drawing can be carried out during and/or after the coagulating operation, before, during and/or after the neutralizing operation, before, during and/or after the washing operation, or even optionally during the drying operation, by means of just one or of several drawing systems.

The alcohol that was contained in the gelled yarn 10b, leaving the coagulation chamber 4, was eliminated during the neutralizing and washing operations, such that the yarn 10 obtained now contains substantially no alcohol, which has a notable influence on its structure.

It is known that, like many natural polymers, chitosan is a semi-crystalline polymer which has several crystalline forms, the main two of which correspond to the hydrated and anhydrous allomorphs (Okuyama, K., et al., *Structural diversity of chitosan and its complexes*. Carbohydrate Polymers, 2000, 41(3), pp. 237-247). The hydrated form is the most common polymorph form of chitosan. The crystal unit cell is in this case stabilized by the presence of water molecules allowing the formation of hydrogen bridges. There are a minimum of three water molecules for eight glucosamine units in the unit cell. The anhydrous form of chitosan is, on the other hand, less abundant owing to the high affinity of the polymer with water. It can, however, be obtained by means of post-curing at a temperature of about 240° C., as mentioned by Ogawa, K., *Effect of heating an aqueous suspension of chitosan on the crystallinity and polymorphs*. Agricultural and Biological Chemistry, 1991, Vol. 55 (No. 9) pp. 2375-2379.

According to the present invention, this anhydrous crystalline form is obtained under particular conditions for processing the material, allowing the crystallinity to develop in a hydrophobic medium. Unlike the hydrated allomorph, no water molecule is present within the anhydrous crystal unit cell. The unit cell is then more compact and the mechanical properties are substantially improved. Furthermore, this form is less readily rehydrated upon simple contact with water, and retains good mechanical properties even in an aqueous medium.

A morphological study by X-ray diffraction analysis (synchrotron radiation) has made it possible to demonstrate the generation of the anhydrous crystalline form, during the formation of the chitosan yarn according to the method of the present invention, most particularly but not exclusively by varying the neutralizing conditions.

It emerges from this study that, before neutralization, the structure of the gelled yarn 10b is not very crystalline. It is weakly orientated. On the other hand, after alkaline neutralization, the WAXS (wide angle X-ray scattering) images demonstrate orientated crystalline systems, which demonstrates the importance of the neutralizing step in the development of the crystallinity. In addition, the crystals formed are orientated in a preferential direction, the axis of the macromolecular chains corresponding to the axis of the yarn. Moreover, the analysis of the diffraction rings makes it possible to note that, depending on the production conditions, anhydrous crystals or a mixture of anhydrous and hydrated crystals are generated in the yarn.

Figure 2:
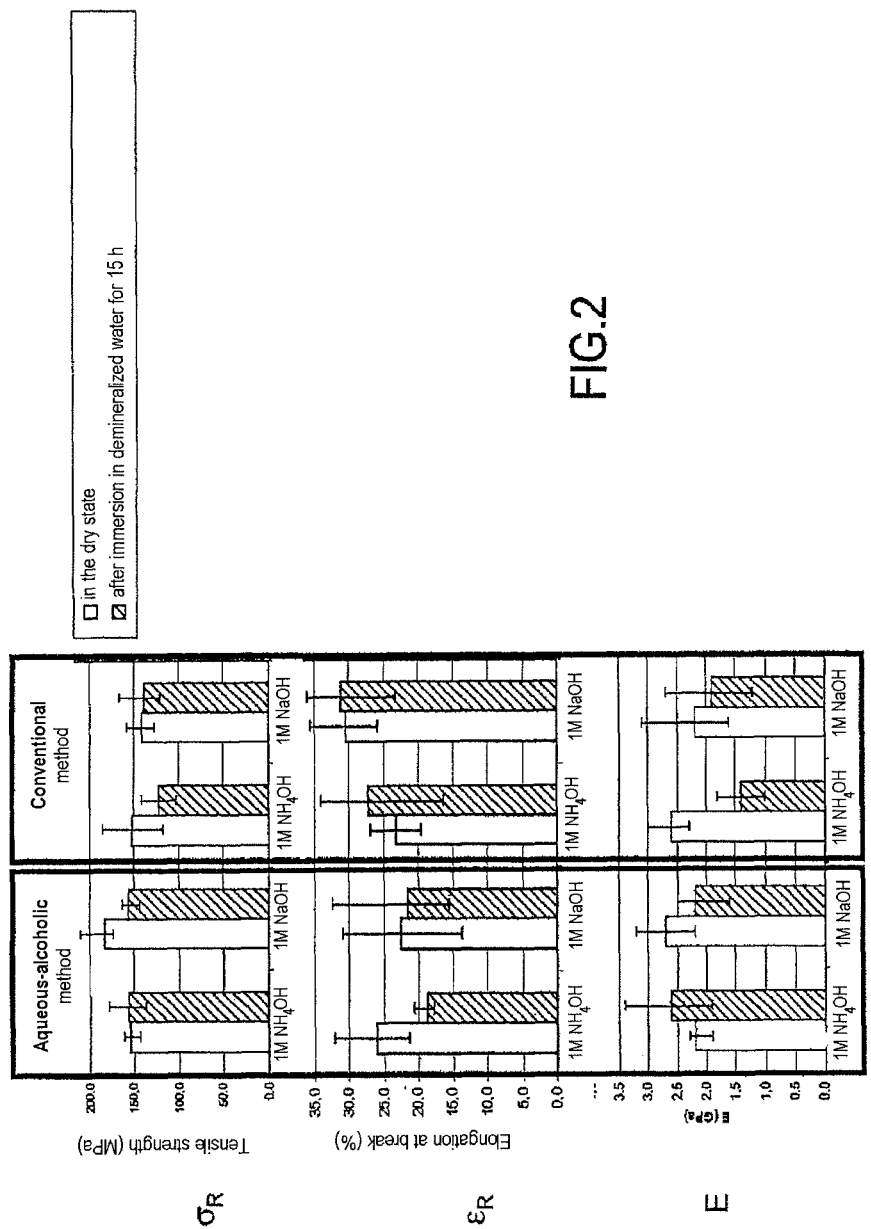
FIG. 2 illustrates comparative tests.

Some comparative tests were carried out with chitosan yarns A and B obtained, for the first ones A, according to the wet spinning technique mentioned above and, for the second ones B, with the method of the present invention, starting from similar chitosan solutions, except for the fact that, for the first ones A, the solution is strictly aqueous, whereas, for the second ones B, it is aqueous-alcoholic. The comparative tests were carried out, firstly, with the yarns A and B in the dry state and, secondly, after immersion in demineralized water for fifteen hours. FIG. 2 illustrates the results obtained for the elongation at break (percentage) and the tensile strength (MPa) for two types of yarn A and two types of yarn B, one being obtained with a neutralizing operation in a molar aqueous ammonia solution and the other in a molar sodium hydroxide solution. It emerges in particular that the yarn B of chitosan 10 obtained with aqueous ammonia or sodium hydroxide neutralization, after immersion in demineralized water for fifteen hours, has a tensile strength of at least 150 MPa, which is greater than that obtained with the yarn A.

In order to obtain a yarn 10 of chitosan, and more generally of polysaccharide, having a maximum of anhydrous crystals in its crystal structure, it is important to control the water evaporation operation so as to obtain total or partial evaporation of the water contained in the extruded yarn 10a; in particular in the example described, it is important to control the flow rate and the temperature of the hot air flow according to the extrusion parameters and the composition of the aqueous-alcoholic solution.

The elongate element obtained by virtue of the method of the invention, whether it is a single-filament or multifilament yarn, a film or a sheet (or any other form, etc), can be used alone or in combination with other elements. For example, the yarn may be assembled with one or more other yarns so as to form, for example by throwing or wrapping, a composite yarn. For example, the film may be assembled with one or more other films, for example by coating, adhesive bonding or thermal-bonding, so as to form a multilayer film. The same is true for the sheet or other form.

The elongate element obtained by virtue of the method of the invention can be used in many applications, wherever the use of a polysaccharide is desired. More particularly, it is intended to participate in the production of materials intended for medical use, concerning in particular textile materials.

Particularly in medical applications, the bioresorption properties of the elongate polysaccharide element obtained by means of the method of the invention may be desired. It should be noted, in this regard, that the presence of the anhydrous allomorph makes it possible to increase the resorption time thereof in vivo. The controlled formation of this anhydrous allomorph makes it possible to adjust the resorption time that may be desired case by case. The same is true during the assembling of the elongate element of the invention having this anhydrous allomorph with other elements, as mentioned above. Furthermore, as regards a chitosan element, it is also possible to vary the degree of acetylation of the chitosan used to form the aqueous-alcoholic solution in order to adjust the resorption time of said element.

The present invention is not limited to the embodiments which have been described in detail above. In particular, the elimination of the alcohol contained in the mainly alcoholic gelled element can be obtained by evaporation of said alcohol.

We claim:

1. A chitosan yarn having a crystal structure corresponding to the anhydrous allomorph and a tensile strength, after immersion in demineralized water for fifteen hours, of at least 150 MPa.

2. The chitosan yarn as claimed in claim 1, characterized in that the weight-average molar mass of the chitosan is greater than 350 000 g/mol.

3. A textile material comprising only chitosan yarns, as claimed in claim 1 or the chitosan yarns assembled with other yarns.

4. A chitosan yarn characterized in that it is made by a method comprising:
    an operation of extruding an extrudable solution of a chitosan through an extrusion die and an operation of coagulating the extruded solution, characterized in that:
        the extrudable solution is an aqueous-alcoholic solution containing an alcohol which does not form an azeotrope with water and which has a boiling point above 150° C. at atmospheric pressure and
        the coagulating operation comprises a step of evaporating the water, in preference to the alcohol, producing a gelled extruded elongate element in the form of a mainly alcoholic gel,
    and in that it comprises at least one operation of eliminating the alcohol contained in said gel in order to obtain the chitosan yarn,
    the chitosan yarn having a crystal structure corresponding to the anhydrous allomorph and a tensile strength, after immersion in demineralized water for fifteen hours, of at least 150 MPa.

5. The chitosan yarn as claimed in claim 4, characterized in that the aqueous-alcoholic solution contains from 1.5 to 3% of chitosan and a water/alcohol proportion of from 50/50 to 30/70% by weight.

6. The chitosan yarn as claimed in claim 4 characterized in that the chitosan is acetylated chitosan.

7. The chitosan yarn as claimed in claim 4 characterized in that the chitosan is acetylated chitosan, with a degree of acetylation of less than 40%.

8. The chitosan yarn as claimed in claim 4 characterized in that the alcohol is chosen from the group consisting of 1,2- and 1,3-propanediol, 1,2-, 1,3- and 1,4-butanediol and 1,2,3-propanetriol.

9. The chitosan yarn as claimed in claim 4 characterized in that the extrudable solution is obtained by dissolving chitosan in a dilute aqueous solution of acid, and in that the neutralizing bath is a solution of ammonia, of sodium hydroxide or of potassium hydroxide.

10. The chitosan yarn as claimed in claim 4 characterized in that the weight-average molar mass of the chitosan is greater than 350 000 g/mol.

11. A textile material, comprising only chitosan yarns, as claimed in claim 4 or the chitosan yarns assembled with other yarns.

12. The chitosan yarn as claimed in claim 4 characterized in that the evaporation of water is obtained by subjecting the extruded solution to an action of a hot air flow.

13. The chitosan yarn as claimed in claim 9 characterized in that the dilute aqueous solution of acid is a dilute aqueous solution of acetic acid.

* * * * *